March 10, 1931.    P. W. G. NIELSON    1,795,792
FEED MIXER
Filed April 2, 1930    3 Sheets-Sheet 1

Inventor
P.W.G. Nielson
By Browne & Phelps
Attorneys

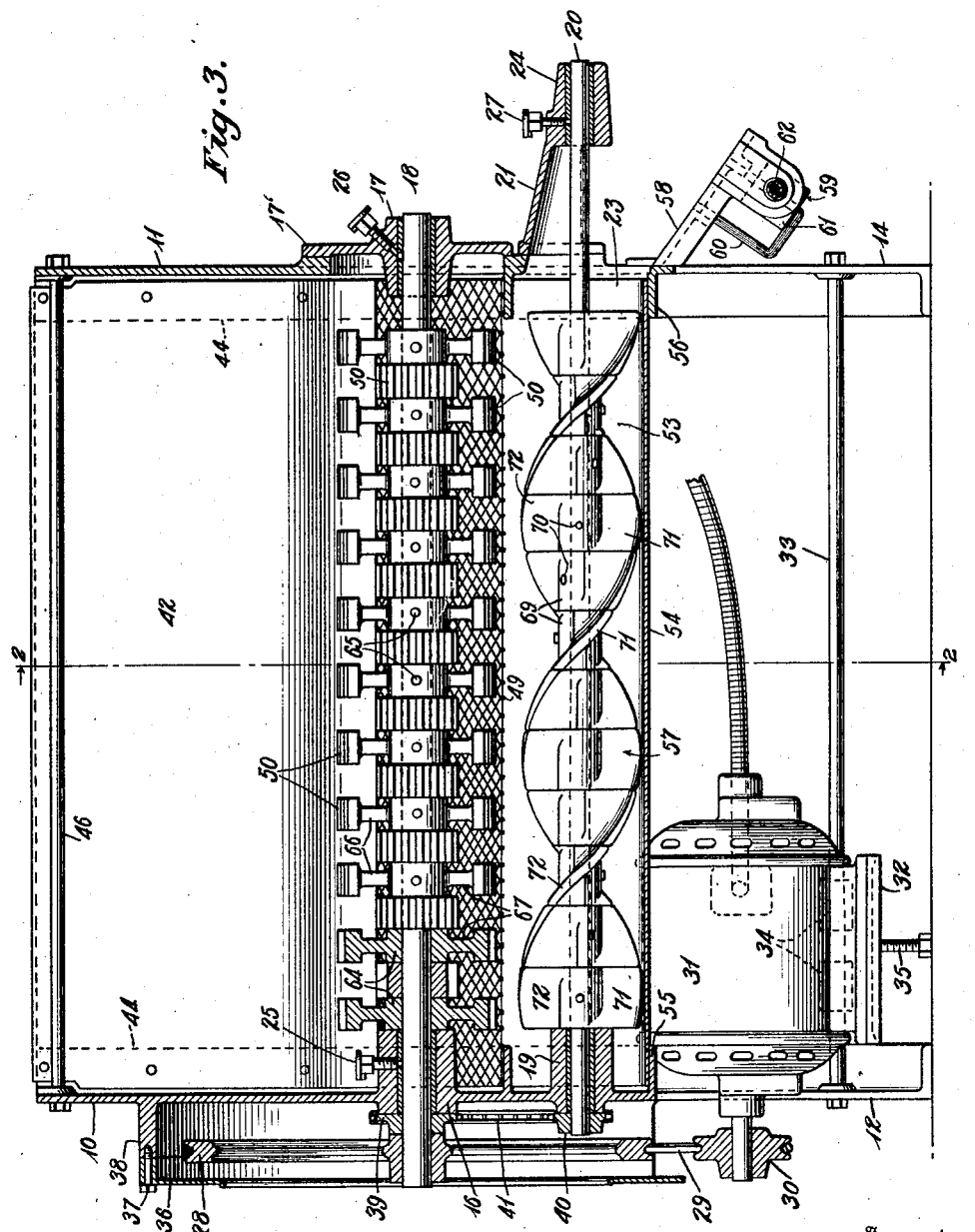

March 10, 1931.  P. W. G. NIELSON  1,795,792
FEED MIXER
Filed April 2, 1930   3 Sheets-Sheet 3
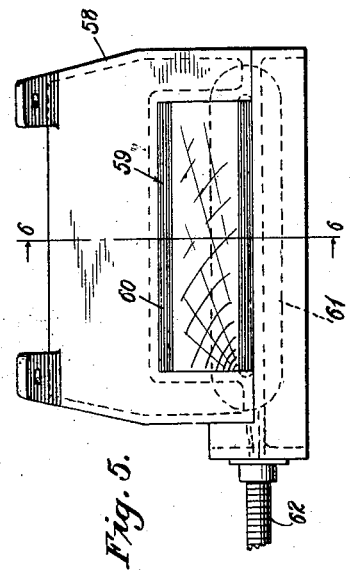
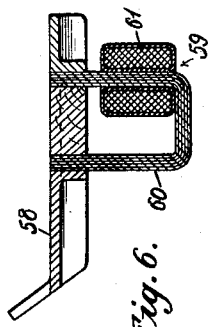
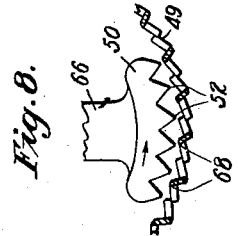
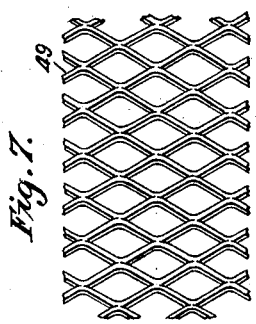
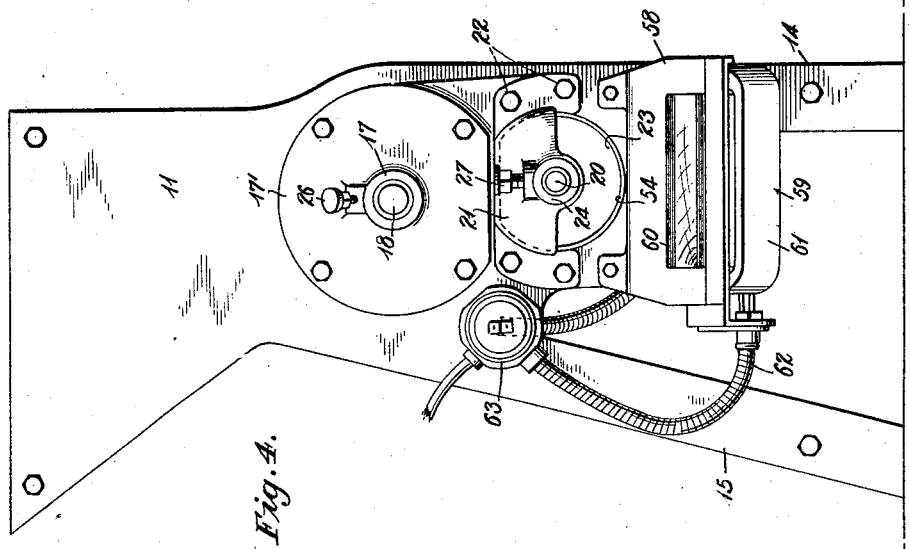
Inventor
P.W.G. Nielson
By Brown & Phelps
Attorneys Patented Mar. 10, 1931

1,795,792

UNITED STATES PATENT OFFICE

PONTUS W. G. NIELSON, OF GREENSBORO, NORTH CAROLINA, ASSIGNOR TO MONARCH MACHINE AND MANUFACTURING COMPANY, INCORPORATED, A CORPORATION OF NORTH CAROLINA

FEED MIXER

Application filed April 2, 1930. Serial No. 441,073.

The invention relates to feed mixers and has as an object the provision of a machine to efficiently and rapidly mix large quantities of feed with a small expenditure of power.

It is a further object of the invention to provide a machine that will mix feed and ensure that no lumps of material are left therein.

It is a further object of the invention to provide a machine that will cut large particles or lumps of material while mixing the same thoroughly with the remaining ingredients of the feed.

It is a further object of the invention to provide a machine that will mix feed and turn out an intimate mixture of the ingredients in finely divided condition and remove any particles of metal therefrom.

It is a further object of the invention to improve generally the details of machines of this character.

Further objects of the invention will appear from the following description when read in connection with the accompanying drawings showing an illustrative embodiment of the invention and wherein:

Fig. 3 is a vertical longitudinal section on line 3—3 of Fig. 1;

Fig. 4 is an end view from the right of Fig. 3;

Fig. 5 is a detail side view of the magnetic attachment upon an enlarged scale;

Fig. 6 is a vertical section on line 6—6 of Fig. 5;

Fig. 7 is a detail enlarged side elevation of a portion of the screen; and

Fig. 8 is a detail side elevation of a mixing element showing its relation to a portion of the screen shown in section.

Figure 2:
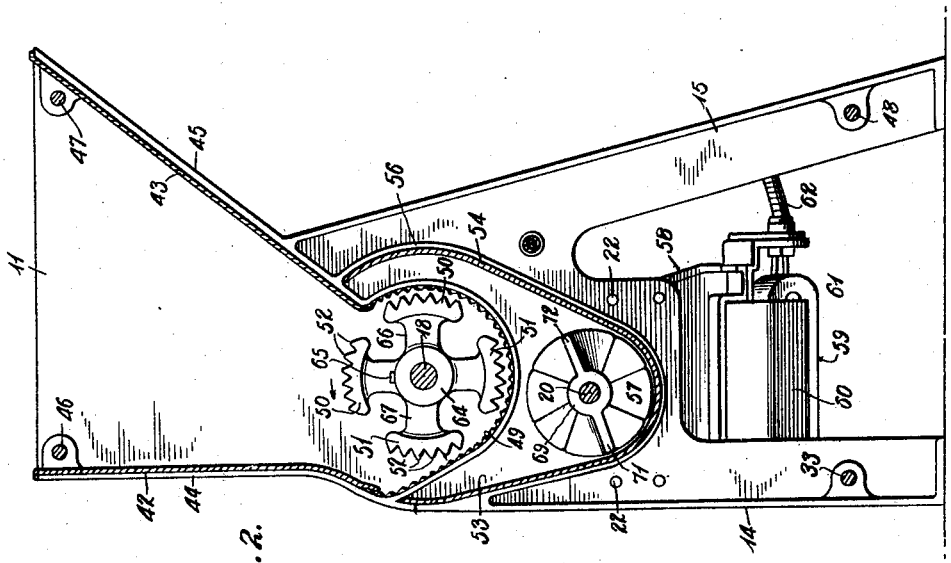
Fig. 2 is a vertical transverse section on line 2—2 of Fig. 3.
Figure 1:
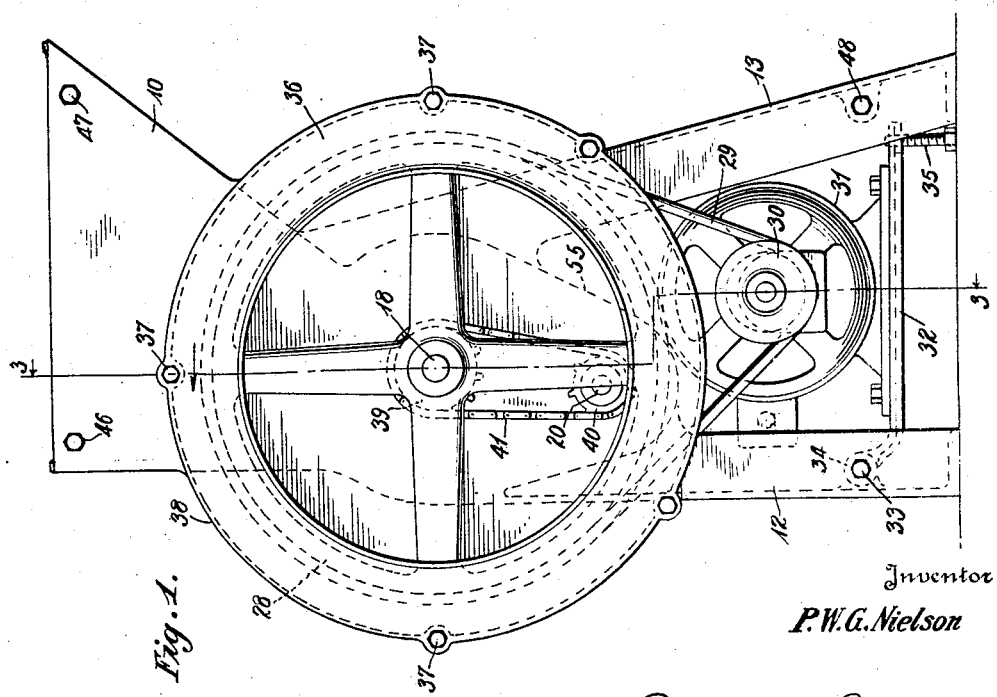
Fig. 1 is an end view.

As shown the device comprises end members 10, 11, preferably formed as castings and presenting the legs 12, 13, 14, 15. In the casting 10 are formed bearings 16, 19 for shafts 18 and 20 respectively. A second bearing 17 for shaft 18 is shown as formed in a plate 17' secured to the plate 11.

A second bearing for the shaft 20 is shown as formed upon a casting 21 which may be secured to the end member 11 as by bolts 22, the casting 21 projecting outwardly so as to clear the outlet opening 23 and carrying bearing 24 for the shaft 20. For lubrication of the shafts 18, 20, grease or oil cups, 25, 26 and 27 are shown.

To drive the shaft 18 there is shown a belt pulley 28 fixed upon the shaft 18 adapted to be driven by a belt 29 preferably of V-type driven by pulley 30 upon the shaft of motor 31. The motor 31 is shown as mounted upon a base 32 which base hingedly engages the longitudinal tie rod 33 of the frame of the device, as indicated at 34, and the free end of the base 32 is shown as supported upon a cap screw 35 which may rest upon the floor. By this arrangement adjustment of the cap screw 35 may allow the weight of the motor to act as a tightener of the belt 29 to a desired degree. A guard for the belt pulley 28 is shown in the form of an annular plate 36 secured as by cap screws 37 to an annular flange 38 formed upon the casting 10.

To drive the conveying shaft 20 there is shown a sprocket 39 formed upon the belt pulley 28 driving sprocket 40 keyed to shaft 20 by means of sprocket chain 41.

The end members 10, 11 are shown as supporting the sides of a hopper 42, 43 extending longitudinally of the machine between said end members. The end members 10, 11 are formed as angles having flanges 44, 45 projecting into overlapping relation with the ends of members 42, 43, which members may be bolted to the said flanges.

Tie rods 46, 47, 48 are shown in addition to the tie rod 33 already mentioned, which rods preserve the spacing of the end members 10, 11 and retain the frame of the device rigid.

The hopper 42, 43 is shown as downwardly closed by a screen 49 and mixing elements 50, 51 are shown mounted upon the shaft 18, which mixing elements bear teeth 52 revolving closely adjacent the screen 49. The shaft 18 and the mixing elements 50, 51 revolve in the direction of the arrow on Fig. 2.

The side 43 of the hopper is shown as inclined and terminates closely adjacent the paths of the mixing elements 50, 51, whereas the side 42 of the hopper is substantially vertical and the screen 49 is spaced away from the path of the mixing elements at the lower edge of the side 42 of the hopper.

To receive material passed through the screen by action of the mixing elements 50, 51, a chamber 53 is shown enclosed by a wall 54 supported upon flanges 55, 56 carried by the members 10, 11.

To further mix material and to advance the same toward the outlet 23, there is shown a conveying screw 57 carried by the shaft 20. To remove iron or steel particles such as nails or the like which may become mixed with the feed and which may be small enough to be passed through the screen 49, there is shown a table 58 secured to the end member 11 carrying an electromagnet 59. The magnet 59 is desirably formed as shown from a horseshoe magnet 60 having a coil 61 upon one leg thereof, which coil may be energized by means of a cable 62 under control of a switch 63, which switch may also control the current to the motor 31 through a cable 73.

The mixing elements are desirably formed of like members each comprising a hub 64 secured to the shaft 18 by means of set screws 65, each hub bearing arms 66, 67 upon the ends of which arms the mixing elements 50, 51 are mounted and in assembling the elements upon the shaft 18 the arms 66, 67 are arranged in alternating positions with the arms 66, 67 perpendicular to the arms of the adjacent members, thereby securing a maximum mixing effect as the feed is forced and rubbed through the screen 49.

The screen 49 is shown as presenting a plurality of cutting edges 68 opposed to the direction of revolution of the elements 50, 51. Such cutting edges may be desirably formed as shown by making the screen 49 of expanded metal of a well known form so placed, as shown in Fig. 8, to present the referred to cutting edges. Other forms of the screen presenting cutting edges may be substituted for that shown.

The conveyor screw 57 may be formed of a plurality of like castings each formed with a hub 69 screwed upon the shaft 20 as by means of set screws 70 and each hub bearing a pair of wings 71, 72 which as shown in the case of the members presented in end view in Fig. 3 are placed diagonally to the axis of the hub 69.

The separate members are assembled on the shaft 20 with the edges of the wings 71, 72 registering with the adjacent wings whereby a spiral conveyor is provided as shown in Fig. 3.

In the operation of the device ingredients of the feed may be dumped into the hopper and the shafts 18 and 20 be set into operation by starting of the motor 31, when the feed will be thoroughly mixed and forced through the screen 49 by means of teeth 52, any lumps being pulverized by this action and any large particles of foreign material being screened out by means of screen 49. The material falling into the chamber 53 will be acted upon by the conveying and mixing screw 57 to continue the mixing action and to force the feed toward the outlet 23 where the feed will slide over the table 58 and any iron or steel particles will be extracted by the magnetic member 59.

Minor changes may be made in the physical embodiment of the invention within the scope of the appended claims without departing from the spirit of the invention.

I claim:

1. A feed mixer comprising, in combination, a hopper, a substantially semi-cylindrical screen in the bottom of said hopper of expanded metal with the portions providing the meshes constituting cutting edges, a shaft mounted to revolve on the axis of said screen, a plurality of arms rigid with and projecting from said shaft, mixing elements carried by said arms each formed with a plurality of rigid serrations revolving closely adjacent to said screen to cut and mix material and force it through said screen.

2. A feed mixer comprising, in combination, a hopper, a substantially cylindrical screen forming the bottom of said hopper of expanded metal with the portions providing the meshes constituting cutting edges, a shaft mounted to revolve on the axis of said screen, a plurality of hubs fixed on said shaft, an arm rigid with and projecting from each hub and terminating in a head, rigid teeth formed on the circumferential surfaces of said heads, their apices revolving closely adjacent to said screen whereby on revolution of said shaft to cut and mix material in the hopper and force the same through the screen.

3. A feed mixer comprising, in combination, a hopper having a substantially perpendicular side and an inclined side converging downwardly, a shaft mounted for revolution in said hopper, mixing elements rigidly mounted on said shaft to revolve upwardly toward and closely adjacent the lower edge of said inclined side, a foraminous bottom for said hopper, a portion thereof formed substantially as a half cylinder concentric with said shaft and extending from the lower edge of said inclined side, said bottom extending from said semi-cylindrical portion upwardly and outwardly tangential to the path of said mixing elements to meet the lower edge of said perpendicular side and means to revolve said shaft.

4. A feed mixer comprising, in combination, a hopper, a shaft mounted for revolution in the lower portion of said hopper, mixing elements rigidly mounted on said shaft, said hopper comprising a substantially perpendicular side offset from the path of said elements and an inclined side lying in a plane passing closely adjacent the axis of said shaft, a foraminous bottom for said hopper, a portion of said bottom formed as a half cylinder lying closely adjacent the path of said elements and having one edge coinciding with the lower edge of said inclined side, the bottom extending from the other edge of the semi-cylindrical portion upon a tangent to the path of said elements to meet the lower edge of said perpendicular side, and means to revolve said shaft upwardly past the edge of said inclined side of the hopper.

5. A feed mixer comprising, in combination, first and second end castings, the first casting having an upper and a lower bearing integral therewith, a shaft journaled in said upper bearing, the second casting having an opening therethrough, a removable plate covering said opening provided with a bearing for said shaft, mixing means carried by said shaft, a screen below and coacting with said mixing means, inwardly extending flanges on said castings supporting said screen, a shaft journaled in said lower bearing, the second casting having a discharge opening opposite the lower bearing, said second shaft extending outwardly beyond the second casting, bearing means extending from the second casting and engaging the second shaft in spaced relation to the second casting, a drive means for the first mentioned shaft disposed outwardly of the first casting, a flange integral with the first casting and extending outwardly therefrom, an annular frame secured to the last mentioned flange and about said drive means, a driving connection between the first and second shafts, a conveyor carried by the second shaft, a plate adjacent said conveyor, flanges integral with the first and second castings supporting said plate, and means to operate the said drive means.

PONTUS W. G. NIELSON.